(12) United States Patent
Lin et al.

(10) Patent No.: US 12,355,711 B2
(45) Date of Patent: Jul. 8, 2025

(54) INFORMATION PROCESSING METHOD AND APPARATUS, AND ELECTRONIC DEVICE AND STORAGE MEDIUM

(71) Applicant: BEIJING ZITIAO NETWORK TECHNOLOGY CO., LTD., Beijing (CN)

(72) Inventors: Yiyuan Lin, Beijing (CN); Jian Sun, Beijing (CN); Yifei Xue, Beijing (CN); Yuanye Wu, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/389,757

(22) Filed: Dec. 19, 2023

(65) Prior Publication Data

US 2024/0163236 A1 May 16, 2024

Related U.S. Application Data

(60) Division of application No. 18/222,200, filed on Jul. 14, 2023, now Pat. No. 12,107,808, and a
(Continued)

(30) Foreign Application Priority Data

Jan. 18, 2021 (CN) .......................... 202110064291.0

(51) Int. Cl.
*H04L 51/046* (2022.01)
(52) U.S. Cl.
CPC ................................. *H04L 51/046* (2013.01)

(58) Field of Classification Search
CPC ...................................................... H04L 51/046
(Continued)

(56) References Cited

U.S. PATENT DOCUMENTS 8,713,112 B2 * 4/2014 Hewitt ................. G06Q 10/107
709/204
8,738,720 B2 * 5/2014 De Kezel ............... G06Q 10/08
709/251
(Continued)

FOREIGN PATENT DOCUMENTS

CN 101207639 A 6/2008
CN 104468323 A 3/2015
(Continued)

OTHER PUBLICATIONS

U.S. Appl. No. 62/985,784, filed Mar. 5, 2020, Yue.
(Continued)

*Primary Examiner* — Anthony Mejia
(74) *Attorney, Agent, or Firm* — BakerHostetler

(57) ABSTRACT

The disclosure relates to the field of computer technology, in particular to an information processing method and apparatus, an electronic device and a storage medium. An information processing method provided by the disclosure includes: displaying an instant messaging session interface configured to display one or more instant messaging information; determining task information based on user input in response to a task creation triggering operation; determining a target session interface associated with the task creation triggering operation; and displaying a task interface in a predetermined form in the target session interface, wherein the task interface is obtained based on the task information and a predetermined information structure.

14 Claims, 7 Drawing Sheets

Related U.S. Application Data continuation of application No. PCT/CN2022/070524, filed on Jan. 6, 2022.

(58) Field of Classification Search
USPC .......................................................... 709/204
See application file for complete search history.

(56) References Cited

U.S. PATENT DOCUMENTS

| | | | |
|---|---|---|---|
| 8,954,431 | B2 | 2/2015 | Okazaki et al. |
| 10,057,197 | B1 | 8/2018 | Ritchie et al. |
| 10,623,359 | B1* | 4/2020 | Rosenstein ............ G06F 40/289 |
| 10,705,694 | B2* | 7/2020 | Taylor .................... G06F 40/106 |
| 10,796,697 | B2* | 10/2020 | Somech ................. G10L 15/222 |
| 10,884,693 | B2* | 1/2021 | Locascio .............. H04L 12/1831 |
| 11,036,816 | B2 | 6/2021 | Kau et al. |
| 11,132,165 | B2* | 9/2021 | Noyes .................. H04L 65/4015 |
| 11,212,242 | B2* | 12/2021 | Cameron .............. H04L 51/216 |
| 11,601,613 | B1* | 3/2023 | Clark ...................... H04N 7/152 |
| 11,652,762 | B2 | 5/2023 | Cameron |
| 11,729,122 | B2 | 8/2023 | Bar-On et al. |
| 12,107,808 | B2 | 10/2024 | Lin et al. |
| 2004/0078445 | A1 | 4/2004 | Malik |
| 2004/0111467 | A1* | 6/2004 | Willis .................. G06F 16/9535 715/201 |
| 2006/0212583 | A1 | 9/2006 | Beadle et al. |
| 2007/0198645 | A1* | 8/2007 | Chen .................... H04L 12/1822 709/207 |
| 2010/0318398 | A1* | 12/2010 | Brun ..................... G06Q 10/109 705/7.18 |
| 2011/0231495 | A1 | 9/2011 | Westen et al. |
| 2016/0100019 | A1* | 4/2016 | Leondires ............. H04L 63/105 709/204 |
| 2016/0255139 | A1* | 9/2016 | Rathod ................. H04L 51/046 709/203 |
| 2017/0005977 | A1 | 1/2017 | Snabl |
| 2018/0152407 | A1 | 5/2018 | Soni |
| 2018/0302231 | A1 | 10/2018 | Sung et al. |
| 2018/0321806 | A1 | 11/2018 | Rodriguez et al. |
| 2018/0359292 | A1 | 12/2018 | Chen et al. |
| 2019/0238489 | A1 | 8/2019 | Cohen |
| 2020/0076746 | A1* | 3/2020 | Penrose ................... G06N 3/08 |
| 2020/0274916 | A1 | 8/2020 | Choi |
| 2021/0073293 | A1* | 3/2021 | Fenton ................... H04L 51/08 |
| 2021/0150489 | A1* | 5/2021 | Haramati .............. G06F 16/252 |
| 2021/0157978 | A1* | 5/2021 | Haramati .............. G06F 40/177 |
| 2021/0278941 | A1 | 9/2021 | Yue |
| 2021/0342785 | A1* | 11/2021 | Mann .................... G06F 40/186 |
| 2021/0344622 | A1* | 11/2021 | Mann ................ G06Q 10/06313 |
| 2021/0406791 | A1 | 12/2021 | Chen et al. |
| 2022/0027834 | A1* | 1/2022 | Zheng .................... G06Q 50/01 |
| 2022/0200937 | A1* | 6/2022 | Bar-on .................... H04L 51/02 |
| 2022/0217213 | A1* | 7/2022 | Tang ................ G06Q 10/06393 |
| 2023/0236789 | A1* | 7/2023 | Locascio ............... G06F 40/169 709/204 |
| 2023/0246860 | A1 | 8/2023 | Hahn et al. |
| 2023/0394395 | A1* | 12/2023 | Zheng .................... G06F 16/22 |

FOREIGN PATENT DOCUMENTS

| | | | |
|---|---|---|---|
| CN | 106033298 | A | 10/2016 |
| CN | 107770043 | A | 3/2018 |
| CN | 107809372 | A | 3/2018 |
| CN | 107819735 | A | 3/2018 |
| CN | 109905315 | A | 6/2019 |
| CN | 110069760 | A | 7/2019 |
| CN | 110601956 | A | 12/2019 |
| CN | 111124564 | A | 5/2020 |
| CN | 111130991 | A | 5/2020 |
| CN | 111352675 | A | 6/2020 |
| CN | 111431795 | A | 7/2020 |
| CN | 111447074 | A | 7/2020 |
| CN | 111654429 | A | 9/2020 |
| CN | 111695070 | A | 9/2020 |
| CN | 112115367 | A | 12/2020 |
| CN | 112202661 | A | 1/2021 |
| JP | 2014-071479 | A | 4/2014 |
| JP | 2015185107 | A | 10/2015 |
| WO | WO 2009/076859 | A1 | 6/2009 |
| WO | WO 2017/006316 | A1 | 1/2017 |
| WO | WO-2018102228 | A1 * | 6/2018 ........... G06Q 10/103 |
| WO | WO 2019/109880 | A1 | 6/2019 |
| WO | WO 2021/112983 | A1 | 6/2021 |

OTHER PUBLICATIONS

International Patent Application No. PCT/CN2022/070524; Int'l Search Report; dated Apr. 8, 2022; 4 pages.

Zhu Ting; "Research and Empirical Analysis of Instant Messaging System"; New Observation; Hangzhou Normal University; Jul. 2013; 2 pages (contains English Abstract).

Zhou et al.; "Instant Messaging Tool Task Collaboration Platform"; Int'l Wireless Communications and Mobile Computing; Jul. 2020; p. 1192-1195.

Specification of U.S. Appl. No. 62/985,784, filed Mar. 5, 2020, "Collaboration User Interface for Computing Device", 23 Pages.

Written Opinion for International Application No. PCT/CN2022/070524, mailed Apr. 8, 2022, 09 Pages.

Notice of Refusal for Japanese Application No. 2023-543117, mailed Dec. 24, 2024, 11 pages.

* cited by examiner

INFORMATION PROCESSING METHOD AND APPARATUS, AND ELECTRONIC DEVICE AND STORAGE MEDIUM

CROSS REFERENCE TO RELATED APPLICATIONS

This disclosure is a divisional application of U.S. patent application Ser. No. 18/222,200, filed on Jul. 14, 2023, which is a continuation of PCT Application No. PCT/CN2022/070524, titled "INFORMATION PROCESSING METHOD AND APPARATUS, AND ELECTRONIC DEVICE AND STORAGE MEDIUM", filed on Jan. 6, 2022, which claims priority to Chinese Patent Application No. 202110064291.0, field on Jan. 18, 2021, titled "INFORMATION PROCESSING METHOD AND APPARATUS, AND ELECTRONIC DEVICE AND STORAGE MEDIUM", the entire contents of all of which are incorporated herein by reference.

FIELD

The disclosure relates to the field of computer technology, in particular to an information processing method and apparatus, an electronic device and a storage medium.

BACKGROUND

Instant messaging software becomes an essential communication tool in daily life and work, where users can create a work group and publish job-related instant messaging information at the work group or forward information from the work group. However, there is a risk that the work information or other relevant information of the work group may be revealed to unrelated persons.

In addition, some instant messaging clients have a function of allowing users to create a to-do list, but the creation of the to-do list is either unknowable to other users of the instant messaging client, which is not conducive to team information sharing and team collaboration, or the creation process is cumbersome and less efficient.

SUMMARY

The summary of the invention is provided to introduce in brief the concepts which will be described in detail later in the embodiments. The summary of the invention is neither intended to identify key or necessary features of the claimed technical solutions, nor intended to limit the scope of the claimed technical solutions.

One aspect of the disclosure provides an information processing method, comprising:
  determining an association relation between a receiver receiving first information and a source of the first information, wherein the first information is generated based on first original information within the source;
  determining information of the source to be displayed to the receiver based on the association relation;
  wherein the information of the source comprises first source information if the association relation is a first association relation, and the information of the source comprises second source information if the association relation is a second association relation.

Another aspect of the disclosure provides an information display method, comprising:
  receiving first information and source information from a server, wherein the source information is determined based on an association relation between an account that currently logs in a client and a source of the first information, and the first information is generated based on first original information within the source; and
  displaying the first information and the source information.

Yet another aspect of the disclosure provides an information display method, comprising:
  displaying an instant messaging session interface configured to display one or more instant messaging information;
  determining task information based on user input in response to a task creation triggering operation;
  determining a target session interface associated with the task creation triggering operation; and
  displaying a task interface in a predetermined form in the target session interface, wherein the task interface is obtained based on the task information and a predetermined information structure.

Yet another aspect of the disclosure provides an information display system, comprising a server and a client, the server being connected with the client, wherein
  the server is configured to perform any information processing method provided by the embodiments of the disclosure.

Yet another aspect of the disclosure provides an information display system, comprising a server and a client, the server being connected with the client, wherein
  the client is configured to perform any information processing method provided by the embodiments of the disclosure.

Yet another aspect of the disclosure provides an information processing apparatus, comprising:
  a relation determination unit, configured to determine an association relation between a user receiving first information and a source of the first information, wherein the first information is generated based on first original information within the source; and
  an information determination unit, configured to determine information of the source to be displayed to the user based on the association relation;
  wherein the information of the source comprises first source information if the association relation is a first association relation, and the information of the source comprises second source information if the association relation is a second association relation.

Yet another aspect of the disclosure provides an information display apparatus, comprising:
  an information receiving unit, configured to receive first information and source information from a server, wherein the source information is determined based on an association relation between an account that currently logs in a client and a source of the first information, and the first information is generated based on first original information within the source; and
  an information display unit, configured to display the first information and the source information.

Yet another aspect of the disclosure provides an information display apparatus, comprising:
  a session information display unit, configured to display an instant messaging session interface that is configured to display one or more instant messaging information;
  a task information determination unit, configured to determine task information based on user input in response to a task creation triggering operation;

a target session determination unit, configured to determine a target session interface associated with the task creation triggering operation; and a task interface display unit, configured to display a task interface in a predetermined form in the target session interface, wherein the task interface is obtained based on the task information and a predetermined information structure.

Yet another aspect of the disclosure provides an electronic device, comprising:

at least one processor; and at least one memory storing instructions that upon execution by the at least one processor cause the electronic device to perform any information processing method provided by the embodiments of the disclosure.

Yet another aspect of the disclosure provides a non-transitory computer storage medium, storing program instructions that upon execution by a computing device, cause the computing device to perform any information processing method provided by the embodiments of the disclosure.

According to one or more embodiments of the disclosure, by determining task information based on user input in response to a task creation triggering operation, and displaying a task interface in a predetermined form within a target session interface, it can facilitate a user to quickly create a task in a session of an instant messaging client, and it also make the task knowable to other users within the session, thereby improving the efficiency of task information synchronization and processing.

BRIEF DESCRIPTION OF THE DRAWINGS

The above and other features, advantages and aspects of various embodiments of the disclosure will become more apparent with reference to the accompanying drawings and specific implementations below. The same or similar reference numerals throughout the drawings denote the same or similar elements. It should be understood that the drawings are schematic and the originals and elements are not necessarily drawn to scale.

DETAILED DESCRIPTION OF THE EMBODIMENTS

Figure 1:
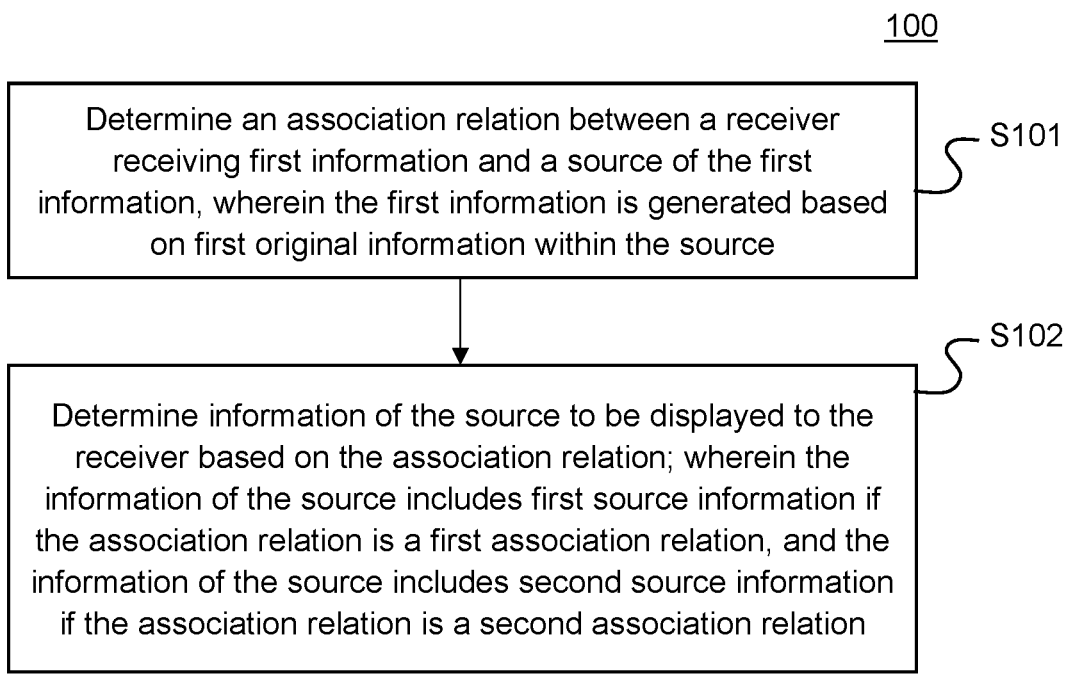
FIG. 1 is a flowchart of an information processing method provided according to an embodiment of the disclosure.

The embodiments of the disclosure will be described in more detail below with reference to the accompanying drawings. Although some embodiments of the disclosure are shown in the accompanying drawings, it should be understood that the disclosure may be implemented in various forms and should not be construed as being limited to the embodiments described herein, on the contrary, these embodiments are provided for a more thorough and complete understanding of the disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" used herein and variants thereof means open-ended including, i.e., "comprising, but not limited to". The term "based on" refers to "based at least in part on". The term "one embodiment" represents "at least one embodiment"; the term "the other embodiment" represents "at least one additional embodiment"; and the term "some embodiments" represents "at least some embodiments". The term "in response to" and related terms mean that one signal or event is influenced to some extent by another signal or event, but not necessarily completely or directly. If an event (e.g., "x") occurs in response to another event (e.g., "y"), x can be directly or indirectly in response to y. For example, the occurrence of y can eventually result in the occurrence of x, but there may be other intermediate events and/or conditions. In other scenarios, y may not necessarily result in the occurrence of x, and x may occur even though y has not occurred. In addition, the term "in response to" can also mean "at least partially in response to". The term "determining" comprises a wide variety of actions, including processing, looking up (e.g., looking up in a database, a table, or another data structure), deriving, computing, calculating, investigating, ascertaining and the like, and may include receiving, accessing (e.g., accessing data in a memory) and the like, as well as parsing, selecting, choosing, establishing and the like. Definitions of other terms will be provided in the description below.

It should be noted that the terms such as "first", "second" and the like mentioned in the disclosure are merely intended to distinguish different devices, modules, or units, rather than limiting an order of functions executed by these devices, modules or units or an interdependence among these devices, modules, or units.

It should be noted that the modifications of "a" and "multiple" mentioned in the disclosure are illustrative, but are not restrictive. It should be understood by those skilled in the art that it should be understood as "one or more" unless otherwise specified in the context.

For the purposes of the disclosure, the phrase "A and/or B" means (A), (B), or (A and B).

Names of messages or information interacted among a plurality of devices in the embodiments of the disclosure are merely for an illustrative purpose, rather than limiting the scope of these messages or information.

FIG. 1 shows a flowchart of an information processing method 100 provided according to an embodiment of the disclosure. The information processing method 100 includes the following steps.

Step S101: an association relation between a receiver receiving first information and a source of the first information is determined, wherein the first information is generated based on first original information within the source.

The source of the first information may include a plurality of information containing the first original information, and the first information is generated based on the first original information.

In one embodiment, the source may be an instant messaging session, where one or more users can send instant messaging information. The first original information may be one piece of instant messaging information in the instant messaging session, and the first information is forwarded information or other association information associated with the instant messaging information, for example, the first information is detail information of the first original information. The receiver is a receiver of the forwarded information, or a requester viewing the association information, and an association relation between the receiver and the instant messaging session may include member relations in the instant messaging session.

It should be noted that those skilled in the art should understand that the above examples are exemplary only, other alternative embodiments and possible variations are available, and the embodiments are not limited thereto. For example, the source may be an information carrier in another form, and the first original information is information within the information carrier. The association relation between the receiver and the information carrier includes whether the receiver and the information carrier satisfy a predetermined association relation, or the like.

In some embodiments, the first original information may be task information or other information within the source from which the task information is generated, and the first information may also be task detail information associated with the task information, wherein the other information within the source may be instant messaging information in the instant messaging session. The task information and the task detail information may include, but are not limited to, content information of a task, personnel information of a task, time information of a task, status information of a task, department information of a task and project information of a task. The content information of the task may include a specific task content. The personnel information of the task may include a task creator, a task assigner and a task performer. The time information of the task may include task creation time, task modification time and task deadline time. The status information of the task may include a task status such as "ongoing" or "cancelled". The department information may include a company department to which a task belongs to. The project information may include a project to which the task belongs to.

In some embodiments, in order to save the display space of the task information in the instant messaging session, the task information displayed may only be part of content information of the task, whereas the task detail information may include entire content information of the task.

In some embodiments, the task information may be created based on instant messaging information sent by any user in the instant messaging session, or may be created directly based on user input. The types of the instant messaging information include, but are not limited to, text, document, picture, audio, video, etc.

Step 102: information of the source to be displayed to the receiver is determined based on the association relation, wherein the information of the source includes first source information if the association relation is a first association relation, and the information of the source includes second source information if the association relation is a second association relation.

The information of the source includes attribute information that may include, but is not limited to, the type and name of the source, and access information such as hyperlinks for accessing the source or obtaining other information than the first original information within the source.

In some embodiments, the first association relation includes that the receiver belongs to a first user group that does not have permission to view predetermined information of the source; or the second association relation includes that the receiver belongs to a second user group that has permission to view predetermined information of the source.

In some embodiments, if the source of the first information is an instant messaging session, the second user group may be members of the instant messaging session and thus have the permission to query the instant messaging session, while the first user group may be not members of the instant messaging session and thus have no permission to query the instant messaging session.

In this way, according to the information processing method provided by one or more embodiments of the disclosure, by determining the information of the source to be displayed to the receiver based on the association relation between the receiver of the first information and the source of the first information, on the one hand, it is convenient for the receiver to learn about the source by displaying the information of the source at the time of displaying the first information, thereby improving the information processing efficiency; and on the other hand, it is possible to prevent the information of the source related to the first information from being revealed to unrelated persons, thereby enhancing the information confidentiality and security.

In some embodiments, the closeness of the relation between the receiver and the source indicated by the first association relation is weaker than the closeness of the relation between the receiver and the source indicated by the second association relation. An information quantity of the second source information is greater than an information quantity of the first source information. In this embodiment, the stronger the closeness of the relation between the receiver and the source of the first information, the larger the information quantity of the obtained information of the source.

In some embodiments, the first source information includes a source type of the source; and/or the second source information comprises association information of the source, and access information of the source, wherein the access information is configured to access the source or obtain other information than the first original information within the source.

In some embodiments, if the source of the first information is an instant messaging session, the first source information may include a source type, such as "session", and the second source information may include association information and access information of the instant messaging session, wherein the association information of the instant messaging session includes, but is not limited to, name (e.g., a group name) of the instant messaging session, a creator (e.g., a group owner) of the instant messaging session, a number of members of the instant messaging session, creation time of the instant messaging session, a project to which the instant messaging session belongs, a department to which the instant messaging session belongs, etc. The access information of the instant messaging session may be configured to access a session page corresponding to the instant messaging session to obtain instant messaging information including the first original information in the instant messaging session.

In this way, other information of the source can be prevented from being revealed to unrelated persons since the first source information only includes the source type of the source, and a user can quickly locate the source of the first information without complicated operations since the second source information includes the association information of the source, and the access information of the source, thereby facilitating the obtaining of context of the first information, and further improving the information processing efficiency.

In some embodiments, the first association relation includes that the receiver is not a member of the first instant messaging session; or the second association relation includes that the receiver is a member of the first instant messaging session.

In some embodiments, an identification of the instant messaging session associated with the receiver may be compared with an identification of a target instant messaging session, and whether the receiver is the member of the first instant messaging session is determined based on a comparison result. Moreover, a user identification of the receiver, such as a user account that logs in a client of the receiver, may be compared with a user identification of the member in the target instant messaging session, and whether the receiver is the member of the target instant messaging session is determined based on a comparison result. It should be noted that whether the receiver is the member of the instant messaging session also can be determined in other manners, which is not limited in the disclosure.

In this way, according to one or more embodiments of the disclosure, different information of sources (instant messaging sessions) is displayed based on whether the receiver is the member of the instant messaging session, which can prevent the instant messaging session from being revealed to unrelated persons.

In some embodiments, if the association relation is the second association relation, the method 100 may further includes the following step.

Step 103: the access information is determined based on a creation manner of the first original information.

The creation manner of the first original information may include, for example, creating it based on other information in the source, or creating it directly based on user input.

In some embodiments, step 103 includes:
step A1: if the first original information is created based on other information within the source, determining the access information based on an identification of the other information; or,
step A2: if the first original information is not created based on the other information within the source, determining the access information based on an identification of the first original information.

In this embodiment, if the first original information is created based on the other information, that is, the other information is the original source of the first information, the access information is determined based on the identification of the other information, for example, the access information may include the identification of the source and the identification of the other information. If the first original information is not created based on the other information, that is, the first original information is created directly based on the user input, the access information is determined based on the identification of the first original information, for example, the access information may include the identification of the source and the identification of the first original information.

In some embodiments, in an example that the source is the instant messaging session, based on the creation manner of the first original information, the access information may include the identification of the source, such as a URL (Uniform Resource Locator) or an ID corresponding to the instant messaging session. The access information may further include an ID of the first original information or an ID of other information. Therefore, the access information may be configured to locate a position where the instant messaging session and the first original information or the other information are located, without the need that the receiver searches and browses the instant messaging session himself or herself.

According to the information processing method provided by one or more embodiments of the disclosure, by determining the access information based on the creation manner of the first original information, the receiver can locate the position where the actual original source of the first information is located via the access information, so that the user can quickly access the context of the first information without complex operations.

Figure 2:
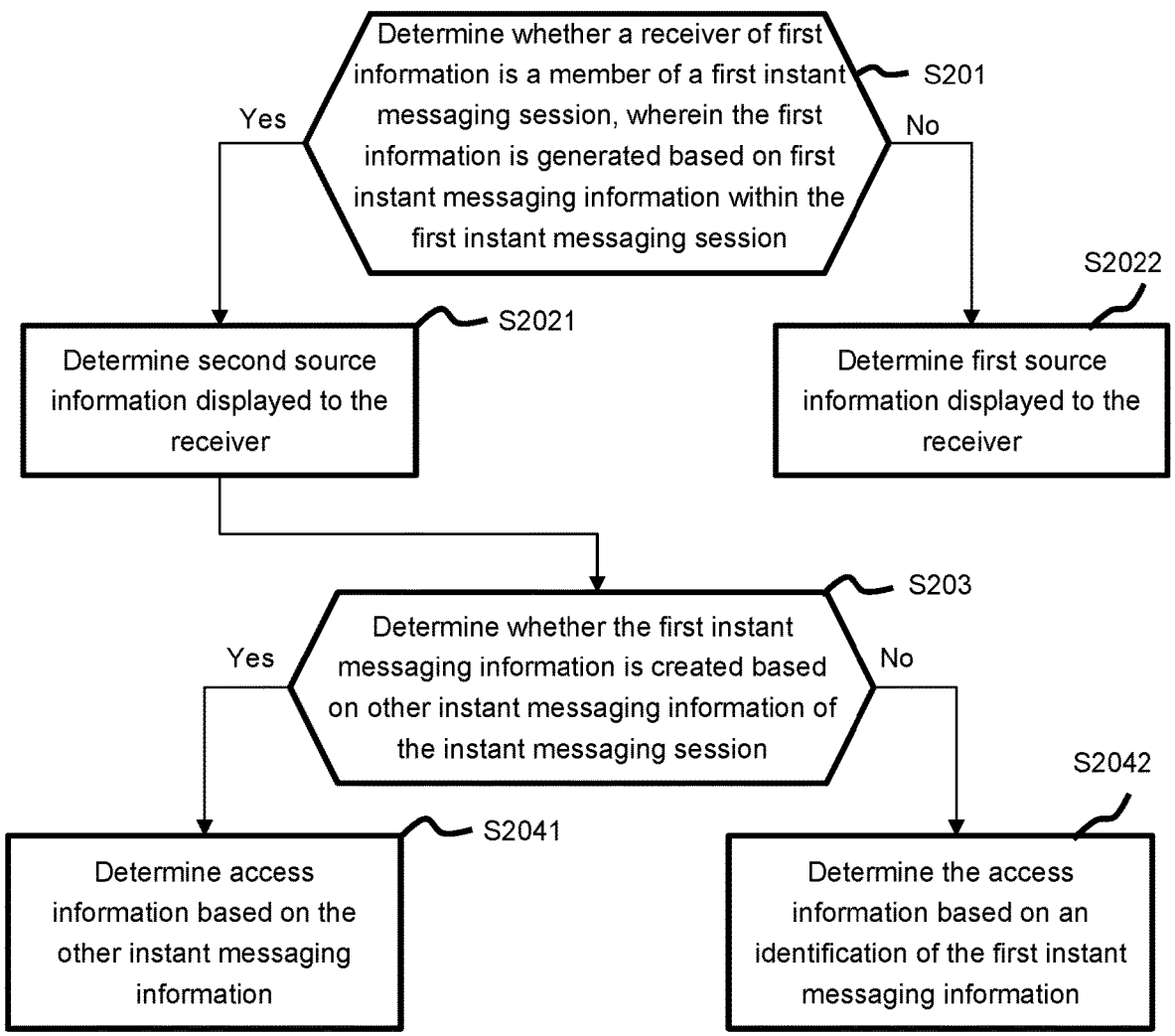
FIG. 2 is a flowchart of an information processing method provided according to another embodiment of the disclosure.

Referring to FIG. 2, which shows an information processing method 200 provided according to another embodiment of the disclosure, including the following steps.

Step S201: whether a receiver of first information is a member of a first instant messaging session is determined, wherein the first information is generated based on first instant messaging information sent within the first instant messaging session.

If the receiver of the first information is the member of the first instant messaging member, step S2021 is performed: determining second source information displayed to the receiver, including association information and access information of the first instant messaging session. Then, step S203 is performed.

If the receiver is not a member of the first instant messaging session, step S2022 is performed: determining first source information displayed to the receiver, including type information of the first instant messaging session such as "session".

Step S203: whether the first instant messaging information is created based on other instant messaging information of the instant messaging session is determined.

If the first instant messaging information is created based on other instant messaging information in the instant messaging session, step S2041 is performed of determining the access information based on the other instant messaging information.

If the first instant messaging information is not created based on the other instant messaging information in the instant messaging session, step S2042 is performed of determining the access information based on an identification of the first instant messaging information.

It should be noted that the information processing method provided by the above embodiments can be performed by a server alone, or by a client alone, or by the combination of the server and the client, which is not limited in the disclosure.

Figure 3:
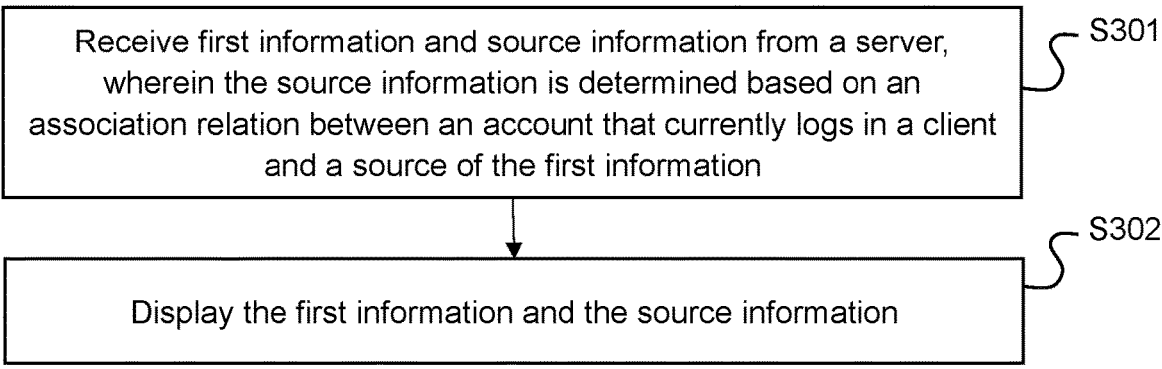
FIG. 3 is a flowchart of an information display method provided according to an embodiment of the disclosure.

Referring to FIG. 3, which shows an information display method 300 provided according to an embodiment of the disclosure, including the following steps.

Step S301: first information and source information from a server are received, wherein the source information is determined based on an association relation between an account that currently logs in a client and a source of the first information, and the first information is generated based on first original information within the source.

Step S302: the first information and the source information are displayed.

In some embodiments, the source information comprises first source information if the association relation is a first association relation; or the source information comprises second source information if the association relation is a second association relation.

According to the information display method provided according to one or more embodiments of the disclosure, by displaying the source information according to the association relation between a receiver of the first information and the source of the first information, on the one hand, it is convenient for the receiver to learn about the source by displaying the source information at the time of displaying the first information, thereby improving the information processing efficiency; and on the other hand, it is possible to prevent the source information related to the first information from being revealed to unrelated persons, thereby enhancing the information confidentiality and security. In some embodiments, the first source information includes a source type of the source; and/or the second source information includes association information of the source, and access information of the source, wherein the access information is configured to access the source or obtain other information than the first original information in the source.

In some embodiments, when the source of the first information is an instant messaging session, the first source information may include a source type, such as "session", and the second source information may include association information and access information of the instant messaging session, wherein the association information of the instant messaging session includes, but is not limited to, name (e.g., a group name) of the instant messaging session, a creator (e.g., a group owner) of the instant messaging session, a number of members of the instant messaging session, creation time of the instant messaging session, a project to which the instant messaging session belongs, a department to which the instant messaging session belongs, etc. The access information of the instant messaging session may be configured to access to a session page corresponding to the instant messaging session.

In this way, other information of the source can be prevented from being revealed to unrelated persons since the first source information only includes the source type of the source. A user can quickly locate the source of the first information without complicated operations since the second source information includes the association information of the source, and the access information of the source, thereby facilitating the obtaining of context of the first information, and further improving the information processing efficiency.

In some embodiments, the first association relation includes that the receiver is not a member of the first instant messaging session; or the second association relation includes that the receiver is a member of the first instant messaging session.

In some embodiments, an identification of the instant messaging session associated with the receiver may be compared with an identification of a target instant messaging session, and whether the receiver is the member of the first instant messaging session is determined according to a comparison result. Moreover, a user identification of the receiver may be compared with a user identification of the member in the target instant messaging session, and whether the receiver is the member of the target instant messaging session is determined according to a comparison result. It should be noted that whether the receiver is the member of the instant messaging session can be determined in other manners, which is not limited in the disclosure.

In this way, according to one or more embodiments, different information of sources (instant messaging sessions) is displayed based on whether the receiver is the member of the instant messaging session, which can prevent the instant messaging session from being revealed to unrelated persons.

In some embodiments, the method 300 further includes the following steps:

step B1: an instant messaging session interface is displayed, wherein the instant messaging session interface is configured to display one or more instant messaging information;

step B2: in response to a triggering operation on the instant messaging information displayed on the instant messaging session interface, task information is determined based on triggered instant messaging information and user input;

step B3: a target session interface associated with the triggering operation is determined; and step B4: a task interface is displayed in a predetermined form in the target session interface, and the task interface is obtained based on the task information and a predetermined information structure.

The triggering operation on the instant messaging information includes, but is not limited to, click, double click, touch click, long press, and the like. In implementation, a user can directly trigger the instant messaging information displayed in the session interface to create the task interface.

In some embodiments, the user may click or long press a certain piece of instant messaging information by a right mouse button, and the client may pop up a menu bar at the position of the instant messaging information in response to an instruction of the user. A "task" option is displayed on the menu bar, and the client pops up a corresponding task editing interface to create task information after the user clicks the "task" option.

According to the information display method provided according the embodiment of the disclosure, in response to the triggering operation on the instant messaging information displayed on the instant messaging session interface, task information is determined based on triggered instant messaging information and user input, and the task information is displayed on the task interface with the predetermined information structure in the target session interface, so that it is not only conveniently for the user to create a task in a session of an instant messaging client, and also it is convenient for other users in the session to learn about the relevant task information quickly, thereby improving the efficiency of task information synchronizing and processing. In addition, it is a common work scenario that work tasks are set according to the requirements of a leader or the advice of a team member. In this regard, according to the information display method provided by the embodiment, the user can post relevant task information directly by triggering instant messaging information sent by himself or others that is already displayed in the session interface, so that the task can be quickly created based on the instant messaging information. Moreover, a direct and definite feedback can be provided to a sender of the instant messaging information by creating the task based on the instant messaging information, thereby improving the information synchronization and collaboration efficiency of the team. In some embodiments, step B2 includes the following steps.

Step b1: initial task information is determined based on the triggered instant messaging information.

In some embodiments, the initial task information may be information that is initially displayed by a task editing interface and can be edited by the user, for example, the client may automatically, or based on the instruction of the user, fill part or all of the contents of the triggered instant messaging information, which are taken as the initial task information, into one or more information input boxes of the task editing interface for modification by the user.

Further, in some embodiments, step b1 includes:
if the triggered instant messaging information includes text information, determining content information of the initial task information based on the text information; and/or
if the triggered instant messaging information includes an electronic file, determining attachment information of the initial task information based on the electronic file.

The triggered instant messaging information may include text information and/or an electronic file. The electronic file refers to a file that is read depending on a computer information display system and can be transmitted over a communication network, including but not limited to office files such as TXT, WORD, EXCEL, PPT and PDF, multimedia files such as pictures, videos and audios, and files corresponding to other software programs.

In some embodiments, step b1 includes:
obtaining user information for a sender of the triggered instant messaging information; and determining creator information of the initial task information based on the user information.

According to one or more embodiments of the disclosure, the triggered instant messaging information is converted into the initial task information for the user to edit, for example, the text information in the instant messaging information is converted into the task content of a task, or the electronic file in the instant messaging information is converted into the attachment of the task, or the sender of the instant messaging information is converted into the creator of the task, which is convenient for the user to quickly create a task interface based on the instant messaging information, thereby improving the interaction efficiency.

In some embodiments, step b1 includes:
step b11: performing semantic recognition on the triggered instant messaging information; and
step b12: determining the initial task information based on a semantic recognition result.

In some embodiments, name information, time information and task information in the triggered instant messaging information may be extracted based on a trained semantic recognition model to serve as initial task information. For example, name information and time information in the instant messaging information, which are extracted by the semantic recognition model, may be filled into the task editing interface as performer information and time information of the task, respectively, and other information can be filled into the task editing interface as the content information of the task.

In some embodiments, step b12 includes:
step b121: obtaining current time information; and
step b122: determining time information of the initial task information based on the semantic recognition result and the current time information.

In some situations, the user may not fill out the time precisely when sending the instant messaging information, for example, time is written as "Tuesday," "Tomorrow," or "Fifth day of this month," which may result in unclear task information displayed on the task interface if the identified time is directly filled as the time information for the task. In this regard, according to the information display method provided by the embodiment of the disclosure, the time information of the initial task information is more accurate by combining the semantically recognized time information with the current time.

According to one or more embodiments, it is possible to improve the efficiency of creating the task interface by the user by performing semantic recognition on the triggered instant messaging information and determining the initial task information based on the semantic recognition result.

Figure 4A:
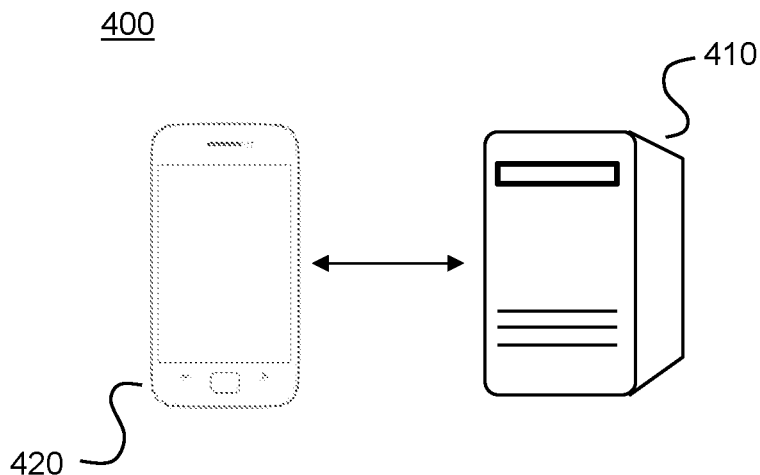
FIG. 4A is a schematic diagram of an information display system provided according to an embodiment of the disclosure.

For the above information display method, FIG. 4A shows a schematic diagram of an information display system provided according to an embodiment of the disclosure, including a server 410 and a terminal 420. The terminal 420 includes, but is not limited to, a mobile terminal such as a mobile phone, a notebook computer, a digital broadcast receiver, a PDA (Personal Digital Assistant), a PAD (Tablet Computer), a PMP (Portable Multimedia Player) and a vehicle-mounted terminal (e.g., a vehicle-mounted navigation terminal), and a fixed terminal such as a digital TV and a desktop computer. The terminal 420 is directly connected to the server 410 through a local area network, a wide area network, or the Internet or indirectly connected the server 410 via other intermediate servers or devices.

Figure 4B:
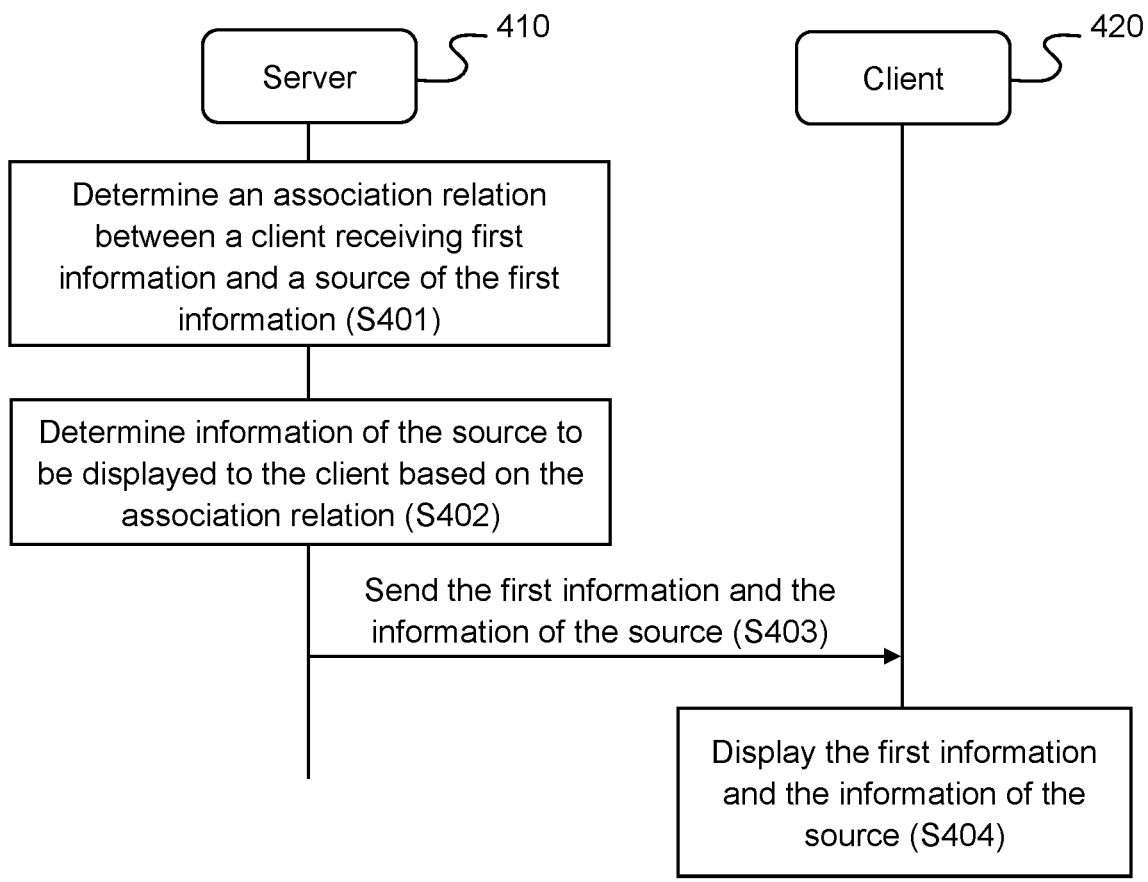
FIG. 4B is a schematic diagram showing a signal flow of an information display system according to an embodiment of the disclosure.

FIG. 4B shows diagram showing a signal flow of a server 410 and a terminal 420 in an information display system provided according to an embodiment of the disclosure.

In step S401, the server 410 determines an association relation between a client receiving first information and a source of the first information, wherein the first information is generated based on first original information in the source.

In step S402, the server 410 determines information of the source to be displayed to the client based on the association relation.

In step S403, the server 410 sends the first information and the information of the source. Accordingly, the client 420 receives the first information and the information of the source from the server 410.

In step S404, the client 420 displays the information of the source.

The information of the source includes first source information if the association relation is a first association relation, and the information of the source includes second source information if the association relation is a second association relation.

According to the information display system provided according to one or more embodiments of the disclosure, by determining the information of the source to be displayed to the receiver based on the association relation between the receiver of the first information and the source of the first information, on the one hand, it is convenient for the receiver to learn about the source by displaying the information of the source at the time of displaying the first information, thereby improving the information processing efficiency; and on the other hand, it is possible to prevent the information of the source related to the first information from being revealed to unrelated persons, thereby enhancing the safety and privacy of the information.

Figure 5:
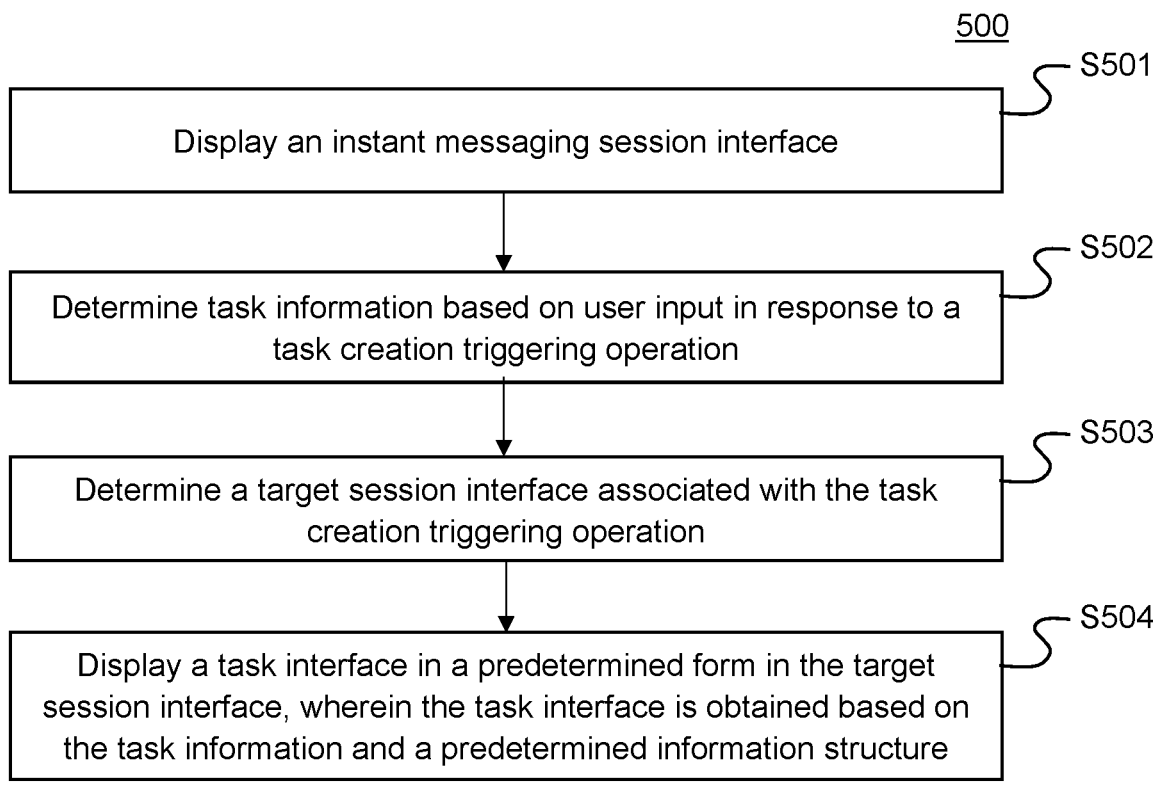
FIG. 5 is a flowchart of an information display method provided according to another embodiment of the disclosure.

Referring to FIG. 5, FIG. 5 shows a flowchart of an information display method 500 provided according to an embodiment of the disclosure. It should be noted that the information display method provided by this embodiment and following embodiments can be implemented independently of the foregoing embodiments. The information display method 500 includes the following steps.

Step S501: an instant messaging session interface is displayed, wherein the instant messaging session interface is configured to display one or more instant messaging information.

Step S502: task information is determined based on user input in response to a task creation triggering operation;
wherein the task creation triggering operation may include, but is not limited to, a touch operation of a user, a gesture operation, a voice instruction, a triggering instruction produced by a built-in or external input device, etc.

In some embodiments, a preset identification may be displayed on the session interface or a text editing interface of the instant messaging interface, and if the user touches or clicks on the preset identification using the external input device, the task editing interface is displayed for user input to determine task information. In some embodiments, the task editing interface may have one or more text input boxes in which the user can enter information such as creators, content, performers, time, attachments, departments and projects of the tasks, etc. The task editing interface may also include button controls for sending or canceling the task. It should be noted that the task editing interface may be displayed in the form of a pop-up window on the upper layer of the session interface or in a predetermined region in other forms, which is not limited in the disclosure.

Step S503: a target session interface associated with the task creation triggering operation is determined.

In some embodiments, a target session interface associated with the task creation triggering operation may be a currently displayed instant messaging session interface or a user selected session interface, or the like.

Step S504: a task interface is displayed in a predetermined form in the target session interface, and the task interface is obtained based on the task information and a predetermined information structure.

In some embodiments, the task information may include, but is not limited to, creator information of the task, content information of the task, performer information of the task, time information of the task, status information of the task, attachment information of the task, department information of the task, and project information of the task. The creator information of the task may include a task creator, a task assigner, a leader and a creator of the task interface. The time information of the task may include task creation time, task modification time and task deadline time. The status information of the task may include a task status such as "in progress" or "cancelled". The department information may include a company department to which the task belongs to. The project information may include a project to which the task belongs to. Correspondingly, the task interface may have corresponding fields arranged in a predetermined format, the above task information is arranged under the corresponding fields respectively.

Figure 6:
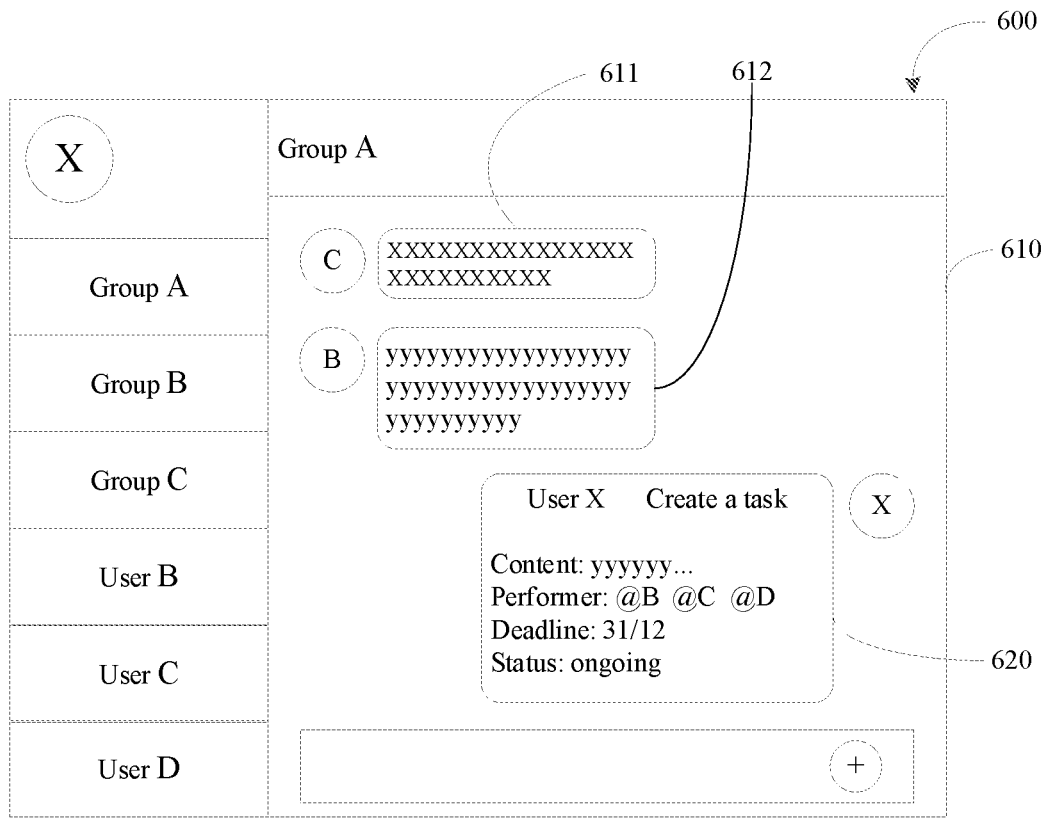
FIG. 6 a schematic diagram showing a display interface of an instant messaging client provided according to an embodiment of the disclosure.

FIG. 6 shows a schematic diagram showing an instant messaging client provided according to an embodiment of the disclosure. An instant messaging client 600 of a user "X" currently displays a session interface 610 for "Group A". The session interface 610 is configured for members in the group to have an instant messaging session, and currently displays instant messaging information 611 and 612. As shown in FIG. 6, the user "X" creates a task interface 620 within the session interface 610 that displays information such as the task creator "user X", the task content "yyyyyy . . . ", performers "B, C, D", the deadline date "12.31", and the task status "in progress".

It should be noted that "interface" of the disclosure includes, but is not limited to, graphical user interfaces such as application windows, pages, controls, components, identifications, or other display elements.

According to the information display method provided by this embodiment, the task information is determined based on user input in response to the task creation triggering operation, and the task information is displayed on the task interface with the predetermined information structure in the target session interface, so that it is not only conveniently for the user to create a task in a session of an instant messaging client, and also it is convenient for other users in the session to learn about the relevant task information quickly, thereby improving the efficiency of task information synchronizing and processing.

In some embodiments, the task creation triggering operation includes a triggering operation on the instant messaging information displayed in the session interface.

The triggering operation on the instant messaging information includes, but is not limited to, click, double click, touch click, long pressing, and the like. In implementation, the user can directly trigger the instant messaging information displayed in the session interface to create the task interface.

In some embodiments, the user may click or long press a certain piece of instant messaging information by a right mouse button, and the client may pop up a menu bar at the position of the instant messaging information in response to an instruction of the user. A "task" option is displayed on the menu bar, and the client pops up a corresponding task editing interface after the user clicks the "task" option to create task information.

It is a common work scenario that work tasks are set according to the requirements of a leader or the advice of a team member. In this regard, according to the information display method provided by one or more embodiments, the user can post relevant task information directly by triggering instant messaging information sent by himself or others that is already displayed in the session interface, so that the task can be quickly created based on the instant messaging information. Moreover, a direct and definite feedback can be provided to a sender of the instant messaging information by creating the task based on the instant messaging information, thereby improving the information synchronization and collaboration efficiency of the team.

In some embodiments, step S502 includes:
step C1: determining initial task information based on triggered instant messaging information in response to the triggering operation on the instant messaging information.

In some embodiments, the initial task information may be information that is initially displayed by a task editing interface and can be edited by the user, for example, the client may automatically, or based on the instruction of the user, fill part or all of the contents of the triggered instant messaging information, which are taken as the initial task information, into one or more information input boxes of the task editing interface for modification by the user.

In some embodiments, step C1 includes:
if the triggered instant messaging information includes text information, determining content information of the initial task information based on the text information; and/or
if the triggered instant messaging information includes an electronic file, determining attachment information of the initial task information based on the electronic file in the task editing interface.

The triggered instant messaging information may include text information and/or an electronic file. The electronic file refers to a file that is read depending on a computer information display system and can be transmitted over a communication network, including but not limited to office files such as TXT, WORD, EXCEL, PPT and PDF, multimedia files such as pictures, videos and audios, and files corresponding to other software programs.

In some embodiments, step C1 includes:
obtaining user information for a sender of the triggered instant messaging information; and determining creator information of the initial task information based on the user information.

According to one or more embodiments, the triggered instant messaging information is converted into the initial task information for the user to edit, for example, the text information in the instant messaging information is converted into the task content of a task, or the electronic file in the instant messaging information is converted into task attachment of the task, or the sender of the instant messaging information is converted into the task creator of the task, so that it is convenient for the user to quickly create a task interface based on the instant messaging information, thereby improving the interaction efficiency.

Further, in some embodiments, step C1 includes:
step c1: performing semantic recognition on the triggered instant messaging information; and
step c2: determining the initial task information based on a semantic recognition result.

In some embodiments, name information, time information and task information in the triggered instant messaging information may be extracted based on a trained semantic recognition model to serve as initial task information. For example, name information and time information in the instant messaging information, which are extracted by the semantic recognition model, may be filled into the task editing interface as performer information and time information of the task, respectively, and other information can be filled into the task editing interface as the content information of the task.

Further, in some embodiments, step c2 includes:
step c21: obtaining current time information; and
step c22: determining time information of the initial task information based on the semantic recognition result and the current time information.

In some situations, the user may not fill out the time precisely when sending the instant messaging information, for example, time is written as "Tuesday," "Tomorrow," or "Fifth day of this month," which may result in unclear task information displayed on the task interface if the identified time is directly filled as the time information for the task. In this regard, according to the information display method provided by the embodiment of the disclosure, the time information of the initial task information is more accurate by combining the semantically recognized time information with the current time.

According to one or more embodiments, it is possible to improve the efficiency of creating the task interface by the user by performing semantic recognition on the triggered instant messaging information and determining the initial task information based on the semantic recognition result.

In some embodiments, step 503 includes:
displaying prompt information to prompt a user whether to take a currently displayed instant messaging session interface as the target session interface.

In some embodiments, the prompt information may include text information or an identification of one or more session interfaces. The prompt information may further include a plurality of sub prompt information displayed in sequence.

In some embodiments, after a user has entered the task information on the task editing interface, a first prompt dialog box may pop up to the user whether to send the task interface to the current session interface. When the user clicks "Yes", the task interface is sent to the current session interface, and when the user clicks "No", a second prompt box pops up that displays identifications of a plurality of session interfaces for the user to select.

In some embodiments, the prompt information may also be displayed directly in the task editing interface, for example, the task editing interface is displayed with an option of "send to current session interface" pre-checked or unchecked by default, i.e., first prompt information. When the option is in checked state, the corresponding task interface will be sent to the current session interface. When the option is in a non-checked state, second prompt information may be displayed, wherein the second prompt displays identifications of a plurality of session interfaces for the user to select. It should be noted that the prompt information and its contents may also be displayed in other ways, which is not limited in the disclosure.

In some situations, when a user creates a task based on instant messaging information within a session interface currently displayed by an instant messaging client, the user may have a need to send a task interface to a session interface corresponding to other users or other groups other than the current session interface. In this regard, according to the information display method provided by one or more embodiments of the disclosure, the user can be enabled to select a session interface to which a task interface needs to be sent by prompting the user whether to take the currently displayed instant messaging session interface as a target session interface.

Figure 7:
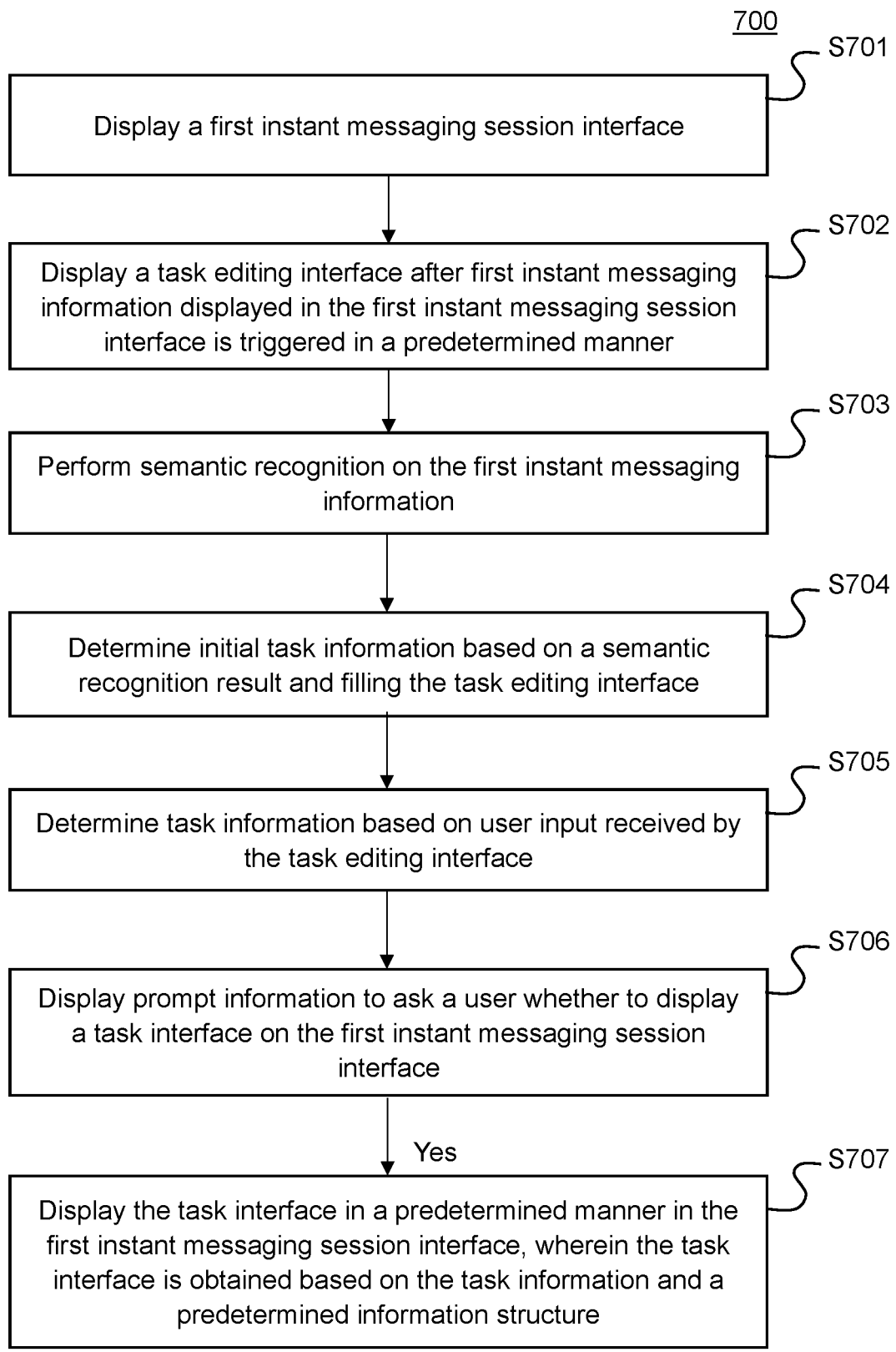
FIG. 7 is a flowchart of an information display method provided according to another embodiment of the disclosure.

Referring to FIG. 7, FIG. 7 shows an information display method 700 provided according to another embodiment of the disclosure, including:
step S701: displaying a first instant messaging session interface;
Step S702: displaying a task editing interface after first instant messaging information displayed in the first instant messaging session interface is triggered in a predetermined manner, wherein the first instant messaging information may be any one of instant messaging information displayed in the first instant messaging session interface;
step S703: performing semantic recognition on the first instant messaging information;
step S704: determining initial task information based on a semantic recognition result and filling the task editing interface;
step S705: determining task information based on user input received by the task editing interface;

step S706: displaying prompt information to ask a user whether to display a task interface on the first instant messaging session interface; if the task interface is displayed on the first instant messaging session interface based an instruction of the user, performing step S707; and step S707: displaying the task interface in a predetermined manner in the first instant messaging session interface, wherein the task interface is obtained based on the task information and a predetermined information structure.

In some embodiments, the task creation triggering operation includes a triggering operation on a task creation identification.

It should be noted that the task creation triggering operation can be directly displayed in the session interface of the client or at other positions, or can be displayed in the session interface of the client or at other positions after other identifications are triggered, which is not limited in the disclosure.

Further, in some embodiments, when the task creation identification is associated with the instant messaging session interface, the target session interface is the instant messaging session interface; or when the task creation identification is not associated with the instant messaging session interface, the method further includes: displaying at least one session identification, and determining the target session interface based on the triggered session identification.

In some embodiments, if the task creation identification is associated with the instant messaging session interface, for example, the task creation identification is located within the instant messaging session interface, or at the position associated with the instant messaging session interface, the instant messaging session interface is determined as the target session interface, that is, a task interface created by triggering the task creation identification is directly sent to the instant messaging session interface. If the task creation identification is not associated with the instant messaging session interface, for example, the task creation identification is located on the main interface of the client or at other positions unassociated with the session interface, the client displays one or more session identifications for the user to select the target session interface.

In some embodiments, the target session interface is a session interface currently displayed by an instant messaging terminal. Generally, when editing a task within a session interface, a user generally intends to send a task interface to the current session interface. In this regard, the operation efficiency can be improved by directly sending the task interface to the session interface currently displayed by the instant messaging terminal in this embodiment.

In some embodiments, the task interface includes a title bar and an information bar, wherein the title bar displays at least one of the following information: creator information of the task, and status information of the task; and the information bar displays at least one of the following information: content information of the task, performer information of the task, time information of the task, attachment information of the task, department information of the task, project information of the task.

In some embodiments, the status information of the task can be indicated by a color in the title bar, for example, if the task has been cancelled, the filling color of the title bar is gray.

In this embodiment, by displaying the creator of the task and the status of the task in the title bar, it can be convenient for other users of the instant messaging session to learn about the relevant information of the task, thereby improving the interaction efficiency.

In some embodiments, the method 500 further includes:
step D1: obtaining user information logging in the instant messaging client;
step D2: displaying creator information of a task determined based on the user information at the task interface.

If the instant messaging information is forwarded to other sessions, users of other sessions often do not know the creator of the instant messaging information. In this embodiment, by displaying the creator information of the task on the task interface, it is easy for users within the instant messaging session to learn about the creator of the task, and also easy for other users to learn about the creator of the task when the task interface is forwarded to other instant messaging sessions, thereby preventing information loss or misleading during information dissemination.

In some embodiments, the method 500 further includes:
step E1: displaying task detail information associated with the task interface when the task interface is triggered in a predetermined manner.

In some embodiments, the task detail information is displayed within a sidebar of the session interface where the task interface is located. In this embodiment, the user can simultaneously browse the task detail information and the context information of the task interface (the session interface corresponding to the task interface) by displaying the task detail information within the sidebar of the session interface, thereby improving the information processing efficiency of the user.

In some embodiments, the task detail information may include association information and access information of the instant messaging session corresponding to the task interface in addition to contents displayed by the task interface. Association information of the instant messaging session includes, but is not limited to, name (e.g., a group name) of the instant messaging session, a creator (e.g., a group owner) of the instant messaging session, a number of members of the instant messaging session, creation time of the instant messaging session, a project to which the instant messaging session belongs, a department to which the instant messaging session belongs, etc. The access information of the instant messaging session is configured to connect to a corresponding session page of the instant messaging session.

In some embodiments, in order to save the display space of the task information in the instant messaging session, the task information may only display part of content information of the task, whereas the task detail information may display entire content information of the task. In some embodiments, the task detail information is editable, and the method 500 further includes:
step F1: determining information displayed by the task interface based on the edited task detail information.

The editable task detail information includes, but is not limited to, creator information of the task, content information of the task, performer information of the task, time information of the task, and status information of the task.

In this embodiment, the information displayed by the task interface can be updated in real time by determining the information displayed by the task interface based on the edited task detail information, thereby improving the efficiency of information synchronization and collaboration within a team.

Figure 8:
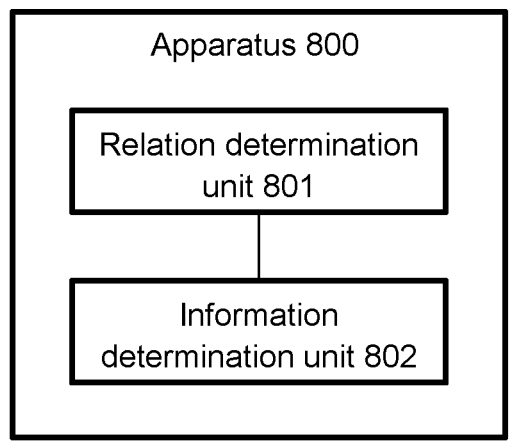
FIG. 8 is a schematic structural diagram of an information processing apparatus provided according to an embodiment of the disclosure.

Correspondingly, as shown in FIG. 8, an information processing apparatus 800 is provided according to an embodiment of the disclosure, including:

a relation determination unit 801, configured to determine an association relation between a user receiving first information and a source of the first information, wherein the first information is generated based on first original information in the source;

an information determination unit 802, configured to determine information of the source to be displayed to the user based on the association relation;

wherein the information of the source includes first source information if the association relation is a first association relation, and the information of the source includes second source information if the association relation is a second association relation.

According to the information processing apparatus provided by one or more embodiments of the disclosure, by determining the information of the source to be displayed to the receiver based on the association relation between the receiver of the first information and the source of the first information, on the one hand, it is convenient for the receiver to learn about the source by displaying the information of the source at the time of displaying the first information, thereby improving the information processing efficiency; and on the other hand, it is possible to prevent the information of the source related to the first information from being revealed to unrelated persons, thereby enhancing the information confidentiality and security.

In some embodiments, the first association relation comprises that the receiver belongs to a first user group that does not have permission to view predetermined information of the source.

In some embodiments, the second association relation comprises that the receiver belongs to a second user group that has permission to view predetermined information of the source.

In some embodiments, a closeness of the relation between the receiver and the source indicated by the first association relation is lower than a closeness of the relation between the receiver and the source indicated by the second association relation, and an information quantity of the second source information is greater than an information quantity of the first source information. In this embodiment, the stronger the closeness of the relation between the receiver and the source of the first information, the larger the information quantity of the obtained information of the source.

In some embodiments, the first source information comprises a source type of the source, and/or the second source information comprises association information of the source and access information of the source, wherein the access information is configured to access the source or obtain other information than the first original information within the source.

In some embodiments, the source of the first information comprises a first instant messaging session, and the first original information comprises first instant messaging information sent within the first instant messaging session.

In some embodiments, the first information comprises information forwarded based on the first instant messaging information, or first association information relevant to the first instant messaging information.

In some embodiments, the first association relation comprises that the receiver is not a member of the first instant messaging session, or the second association relation comprises that the receiver is a member of the first instant messaging session.

In some embodiments, the information processing apparatus 800 further comprises:

an access information determining unit, configured for determining the access information based on a creation manner of the first original information, if the association relation is the second association relation.

In some embodiments, the access information determining unit comprises:

a first access information determining unit, configured for determining the access information based on an identification of the other information, if the first original information is created based on other information within the source, or a second access information determining unit, configured for determining the access information based on an identification of the first original information, if the first original information is not created based on the other information within the source.

In some embodiments, the first original information comprises task information that comprises at least one of the following information: content information of a task, personnel information of a task, time information of a task, status information of a task, department information of a task and project information of a task.

Figure 9:
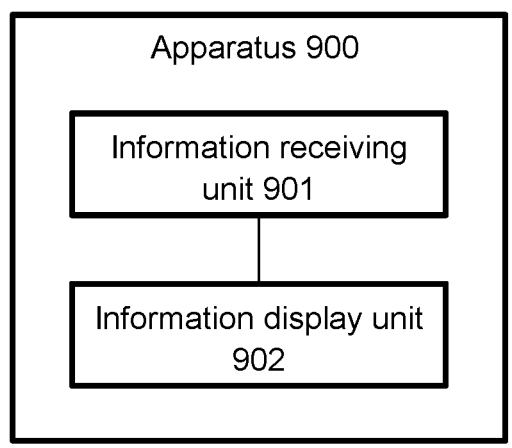
FIG. 9 is a schematic structural diagram of an information display apparatus provided according to another embodiment of the disclosure.

Correspondingly, as shown in FIG. 9, an information display apparatus 900 is provided according to another embodiment of the disclosure, including:

an information receiving unit 901, configured to receive first information and source information from a server, wherein the source information is determined based on an association relation between an account that currently logs in a client and a source of the first information, and the first information is generated based on first original information within the source; and an information display unit 902, configured to display the first information and the source information.

According to the information display apparatus provided according to one or more embodiments of the disclosure, by displaying the source information according to the association relation between a receiver of the first information and the source of the first information, on the one hand, it is convenient for the receiver to learn about the source by displaying the source information at the time of displaying the first information, thereby improving the information processing efficiency; and on the other hand, it is possible to prevent the source information related to the first information from being revealed to unrelated persons, thereby enhancing the information confidentiality and security.

In some embodiments, the source information comprises first source information if the association relation is a first association relation, and the source information comprises second source information if the association relation is a second association relation.

In some embodiments, the first source information comprises a source type of the source, and/or the second source information comprises association information of the source and access information of the source, wherein the access information is configured to access the source or obtain other information than the first original information in the source.

In some embodiments, the first association relation comprises that the receiver is not a member of the first instant messaging session, and the second association relation comprises that the receiver is a member of the first instant messaging session.

In some embodiments, the apparatus 900 further comprises:

a session interface displaying unit, configured for displaying an instant messaging session interface configured to display one or more instant messaging information;

a task information determining unit, configured for, in response to a triggering operation on the instant messaging information displayed on the instant messaging session interface, determining task information based on the triggered instant messaging information and user input;

a target session interface determining unit, configured for determining a target session interface associated with the triggering operation; and a task interface displaying unit, configured for displaying a task interface in a predetermined form in the target session interface, wherein the task interface is obtained based on the task information and a predetermined information structure.

The triggering operation on the instant messaging information includes, but is not limited to, click, double click, touch click, long press, and the like. In implementation, a user can directly trigger the instant messaging information displayed in the session interface to create the task interface.

In some embodiments, the task information determining unit comprises:

an initial task information determining sub-unit, configured for determining initial task information based on the triggered instant messaging information.

In some embodiments, the initial task information may be information that is initially displayed by a task editing interface and can be edited by the user, for example, the client may automatically, or based on the instruction of the user, fill part or all of the contents of the triggered instant messaging information, which are taken as the initial task information, into one or more information input boxes of the task editing interface for modification by the user.

In some embodiments, the initial task information determining sub-unit includes:

a content information determining sub-unit, configured for determining content information of the initial task information based on the text information if the triggered instant messaging information includes text information; and/or an attachment determining sub-unit, configured for determining attachment information of the initial task information based on the electronic file if the triggered instant messaging information includes an electronic file.

In some embodiments, the initial task information determining sub-unit includes:

a creator information determining sub-unit, configured for obtaining user information for a sender of the triggered instant messaging information; and determining creator information of the initial task information based on the user information.

In some embodiments, the initial task information determining sub-unit includes:

a semantic recognition sub-unit, configured for performing semantic recognition on the triggered instant messaging information; and a semantic determination sub-unit, configured for determining the initial task information based on a semantic recognition result.

In some embodiments, name information, time information and task information in the triggered instant messaging information may be extracted based on a trained semantic recognition model to serve as initial task information. For example, name information and time information in the instant messaging information, which are extracted by the semantic recognition model, may be filled into the task editing interface as performer information and time information of the task, respectively, and other information can be filled into the task editing interface as the content information of the task.

In some embodiments, the semantic determination sub-unit includes:

a time obtaining sub-unit, configured for obtaining current time information; and a time information determining sub-unit, configured for determining time information of the initial task information based on the semantic recognition result and the current time information.

In some situations, the user may not fill out the time precisely when sending the instant messaging information, for example, time is written as "Tuesday," "Tomorrow," or "Fifth day of this month," which may result in unclear task information displayed on the task interface if the identified time is directly filled as the time information for the task. In this regard, according to the information display method provided by the embodiment of the disclosure, the time information of the initial task information is more accurate by combining the semantically recognized time information with the current time.

According to one or more embodiments, it is possible to improve the efficiency of creating the task interface by the user by performing semantic recognition on the triggered instant messaging information and determining the initial task information based on the semantic recognition result.

Figure 10:
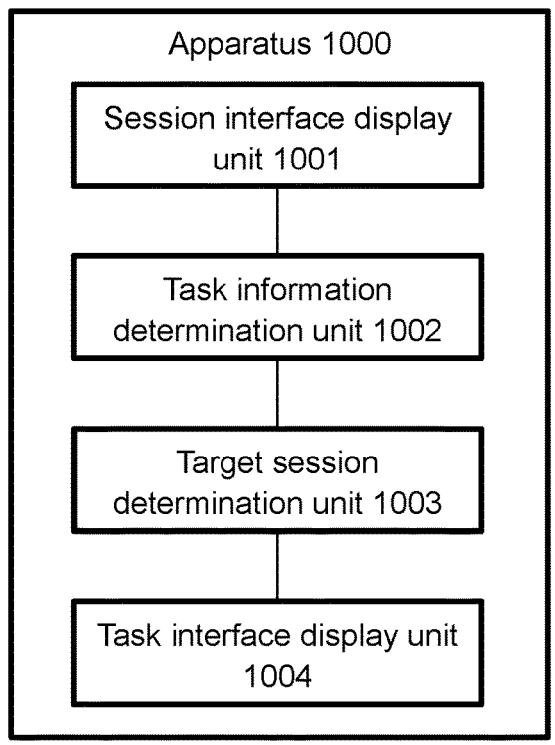
FIG. 10 is a schematic structural diagram of an information display apparatus provided according to yet another embodiment of the disclosure.

Correspondingly, as shown in FIG. 10, an information display apparatus 1000 is provided according to yet another embodiment of the disclosure, including:

a session interface display unit 1001, configured to display an instant messaging session interface that is configured to display one or more instant messaging information;

a task information determination unit 1002, configured to determine task information based on user input in response to a task creation triggering operation;

a target session determination unit 1003, configured to determine a target session interface associated with the task creation triggering operation; and a task interface display unit 1004, configured to display a task interface in a predetermined form in the target session interface, wherein the task interface is obtained based on the task information and a predetermined information structure.

According to the information display apparatus provided by this embodiment, the task information is determined based on user input in response to the task creation triggering operation, and the task interface is displayed in the predetermined form in the target session interface, so that it is not only conveniently for the user to create a task in a session of an instant messaging client, and other users in the session of the task can learn about the task, thereby improving the efficiency of task information synchronizing and processing.

In some embodiments, the task creation triggering operation includes a triggering operation on the instant messaging information displayed in the session interface.

The triggering operation on the instant messaging information includes, but is not limited to, click, double click, touch click, long pressing, and the like. In implementation, the user can directly trigger the instant messaging information displayed in the session interface to create the task interface.

In some embodiments, the user may click or long press a certain piece of instant messaging information by a right mouse button, and the client may pop up a menu bar at the position of the instant messaging information in response to an instruction of the user. A "task" option is displayed on the menu bar, and the client pops up a corresponding task editing interface after the user clicks the "task" option to create task information.

It is a common work scenario that work tasks are set according to the requirements of a leader or the advice of a team member. In this regard, according to the information display method provided by one or more embodiments, the user can post relevant task information directly by triggering instant messaging information sent by himself or others that is already displayed in the session interface, so that the task can be quickly created based on the instant messaging information. Moreover, a direct and definite feedback can be provided to a sender of the instant messaging information by creating the task based on the instant messaging information, thereby improving the information synchronization and collaboration efficiency of the team.

In some embodiments, the task information determining unit 1002 comprises:
  an initial task information determining sub-unit, configured for determining initial task information based on triggered instant messaging information in response to the triggering operation on the instant messaging information.

In some embodiments, the initial task information may be information that is initially displayed by a task editing interface and can be edited by the user, for example, the client may automatically, or based on the instruction of the user, fill part or all of the contents of the triggered instant messaging information, which are taken as the initial task information, into one or more information input boxes of the task editing interface for modification by the user.

In some embodiments, the initial task information determining sub-unit includes:
  a content information determining sub-unit, configured for determining content information of the initial task information based on the text information if the triggered instant messaging information includes text information; and/or
  an attachment determining sub-unit, configured for determining attachment information of the initial task information based on the electronic file if the triggered instant messaging information includes an electronic file.

In some embodiments, the initial task information determining sub-unit includes:
  a creator information determining sub-unit, configured for obtaining user information for a sender of the triggered instant messaging information; and determining creator information of the initial task information based on the user information.

According to one or more embodiments, the triggered instant messaging information is converted into the initial task information for the user to edit, for example, the text information in the instant messaging information is converted into the task content of a task, or the electronic file in the instant messaging information is converted into task attachment of the task, or the sender of the instant messaging information is converted into the task creator of the task, so that it is convenient for the user to quickly create a task interface based on the instant messaging information, thereby improving the interaction efficiency.

In some embodiments, the initial task information determining sub-unit includes:
  a semantic recognition sub-unit, configured for performing semantic recognition on the triggered instant messaging information; and
  a semantic determination sub-unit, configured for determining the initial task information based on a semantic recognition result.

In some embodiments, name information, time information and task information in the triggered instant messaging information may be extracted based on a trained semantic recognition model to serve as initial task information. For example, name information and time information in the instant messaging information, which are extracted by the semantic recognition model, may be filled into the task editing interface as performer information and time information of the task, respectively, and other information can be filled into the task editing interface as the content information of the task.

In some embodiments, the semantic determination sub-unit includes:
  a time obtaining sub-unit, configured for obtaining current time information; and
  a time information determining sub-unit, configured for determining time information of the initial task information based on the semantic recognition result and the current time information.

In some situations, the user may not fill out the time precisely when sending the instant messaging information, for example, time is written as "Tuesday," "Tomorrow," or "Fifth day of this month," which may result in unclear task information displayed on the task interface if the identified time is directly filled as the time information for the task. In this regard, according to the information display method provided by the embodiment of the disclosure, the time information of the initial task information is more accurate by combining the semantically recognized time information with the current time.

According to one or more embodiments, it is possible to improve the efficiency of creating the task interface by the user by performing semantic recognition on the triggered instant messaging information and determining the initial task information based on the semantic recognition result.

In some embodiments, the target session determination unit includes:
  a prompting sub-unit, configured for displaying prompt information to prompt a user whether to take a currently displayed instant messaging session interface as the target session interface.

In some embodiments, the prompt information may include text information or an identification of one or more session interfaces. The prompt information may further include a plurality of sub prompt information displayed in sequence.

In some embodiments, after a user has entered the task information on the task editing interface, a first prompt dialog box may pop up to the user whether to send the task interface to the current session interface. When the user clicks "Yes", the task interface is sent to the current session interface, and when the user clicks "No", a second prompt box pops up that displays identifications of a plurality of session interfaces for the user to select.

Since the apparatus embodiment basically corresponds to the method embodiments, the relevant part can refer to the part of the description of the method embodiments. The apparatus embodiment described above is merely illustrative, and the units described as separate units may or may not be separate. Some or all of the units can be selected according to actual needs to achieve the objects of the solutions of the embodiments. Those of ordinary skill in the art can understand and implement without creative work.

Correspondingly, the disclosure further provides a terminal comprising:
at least one processor; and
at least one memory communicatively coupled to the at least one processor and storing instructions that upon execution by the at least one processor cause the terminal to perform the method for presenting information on a lock screen interface provided by one or more embodiments according to the disclosure.

Correspondingly, the disclosure further provides a non-transitory computer storage medium storing program instructions that upon execution by a computing device, cause the computing device to perform the method for presenting information on a lock screen interface provided by one or more embodiments according to the disclosure.

Figure 11:
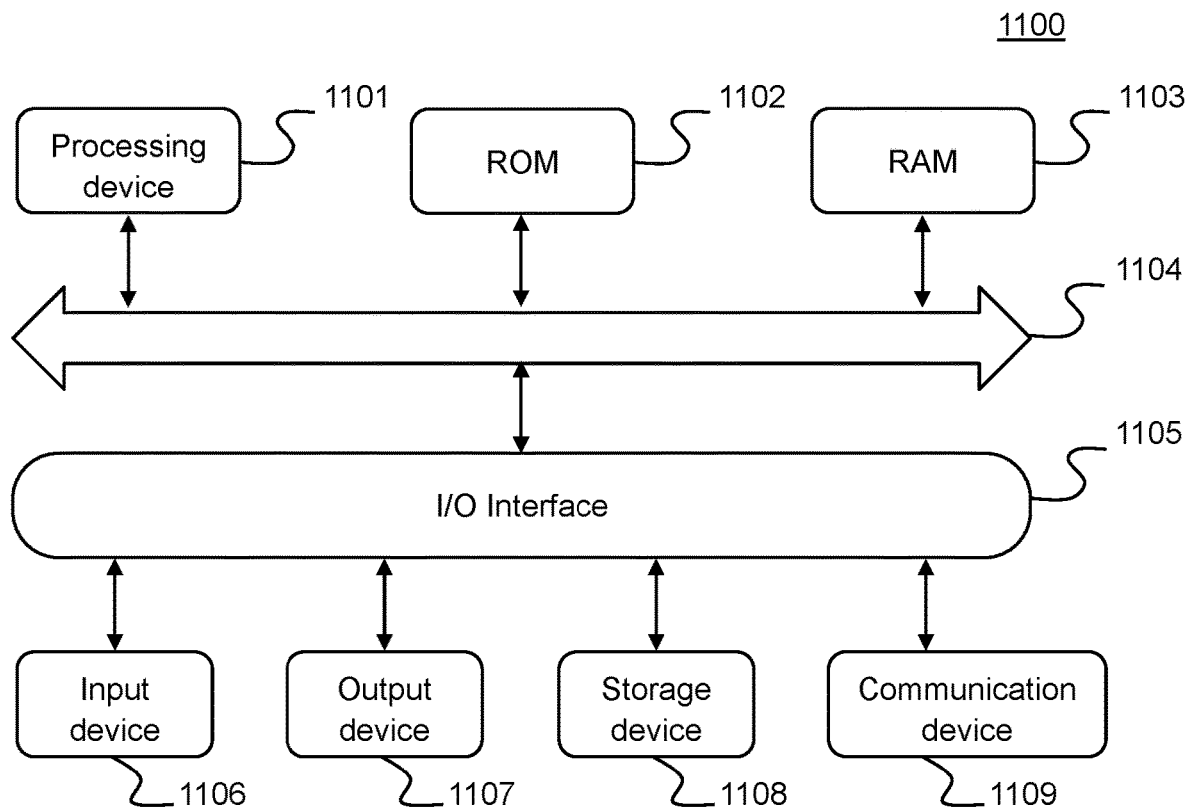
FIG. 11 is schematic structural diagram of an electronic device for implementing an embodiment of the disclosure.

Referring now to FIG. 11, a structural schematic diagram of electronic device 1100 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 11 is only an example, and should not bring any restrictions on the functions and application scope of the embodiments of the present disclosure.

As shown in FIG. 11, the electronic device 1100 can comprise a processing device (e.g., central processing unit, graphics processor, etc.) 1101, which can perform various appropriate actions and processing according to a program stored in a read-only memory (ROM) 1102 or a program loaded into a random access memory (RAM) 1103 from a storage device 1108. In the RAM 1103, various programs and data required for the operation of the electronic device 1100 are also stored. The processing device 1101, the ROM 1102, and the RAM 1103 are connected through a bus 1104. An Input/Output (I/O) interface 1105 is also connected to the bus 1104.

Generally, the following devices can be connected to the I/O interface 1105: an input device 1106 such as a touch screen, a touch pad, a keyboard, a mouse, a camera, a microphone, an accelerometer, and a gyroscope; an output device 1107 such as a liquid crystal display (LCD), a speaker and a vibrator; a storage device 1108 such as a magnetic tape and a hard disk; and a communication device 1109. The communication device 1109 can allow the electronic device 1100 to perform wireless or wired communication with other equipment to exchange data. Although FIG. 11 shows the electronic device 1100 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 1109, or installed from the storage device 1108, or installed from the ROM 1102. When the computer program is executed by the processing device 1101, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (HyperText Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: determine an association relation between a receiver receiving first information and a source of the first information, wherein the first information is generated based on first original information within the source; determine information of the source to be displayed to the receiver based on the association relation; wherein the information of the source comprises first source information if the association relation is a first association relation, and the information of the source comprises second source information if the association relation is a second association relation.

Or the computer-readable medium carries one or more programs, and when the one or more programs are executed by the terminal equipment, the electronic device is caused to: receive first information and source information from a server, wherein the source information is determined based on an association relation between an account that currently logs in a client and a source of the first information and the first information is generated based on first original information within the source; and display the first information and the source information.

Or the computer-readable medium carries one or more programs, and when the one or more programs are executed by the terminal equipment, the electronic device is caused to: display an instant messaging session interface configured to display one or more instant messaging information; determine task information based on user input in response to a task creation triggering operation; determine a target session interface associated with the task creation triggering operation; and display a task interface in a predetermined form in the target session interface, wherein the task interface is obtained based on the task information and a predetermined information structure.

Computer program codes for performing the operations of the disclosure can be written in one or more programming languages or a combination thereof, including object-oriented programming languages such as JAVA®, SMALL-TALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the task determination unit can also be described as "a unit for determining whether a view of a first task is currently displayed on a desktop".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides an information processing method, comprising: determining an association relation between a receiver receiving first information and a source of the first information, wherein the first information is generated based on first original information within the source; determining information of the source to be displayed to the receiver based on the association relation; wherein the information of the source comprises first source information if the association relation is a first association relation, and the information of the source comprises second source information if the association relation is a second association relation.

In some embodiments, the first association relation comprises that the receiver belongs to a first user group that does not have permission to view predetermined information of the source.

In some embodiments, the second association relation comprises that the receiver belongs to a second user group that has permission to view predetermined information of the source.

In some embodiments, a closeness of the relation between the receiver and the source indicated by the first association relation is lower than a closeness of the relation between the receiver and the source indicated by the second association relation, and an information quantity of the second source information is greater than an information quantity of the first source information.

In some embodiments, the first source information comprises a source type of the source, and/or the second source information comprises association information of the source, and access information of the source, wherein the access information is configured to access the source or obtain other information than the first original information within the source.

In some embodiments, the source of the first information comprises a first instant messaging session, and the first original information comprises first instant messaging information sent within the first instant messaging session.

In some embodiments, the first information comprises information forwarded based on the first instant messaging information, or first association information relevant to the first instant messaging information.

In some embodiments, the first association relation comprises that the receiver is not a member of the first instant messaging session, or the second association relation comprises that the receiver is a member of the first instant messaging session.

In some embodiments, if the association relation is the second association relation, the information processing method further comprises: determining the access information based on a creation manner of the first original information.

In some embodiments, the determining the access information based on a creation manner of the first original information comprises: if the first original information is created based on other information within the source, determining the access information based on an identification of the other information; or, if the first original information is not created based on the other information within the source, determining the access information based on an identification of the first original information.

In some embodiments, the first original information comprises task information that comprises at least one of the following information: content information of a task, personnel information of a task, time information of a task, status information of a task, department information of a task and project information of a task.

In some embodiments, the disclosure provides an information display method, comprising: receiving first information and source information from a server, wherein the source information is determined based on an association relation between an account that currently logs in a client and a source of the first information and the first information is generated based on first original information within the source; and displaying the first information and the source information.

In some embodiments, the source information comprises first source information if the association relation is a first association relation, and the source information comprises second source information if the association relation is a second association relation.

In some embodiments, the first source information comprises a source type of the source, and/or the second source information comprises association information of the source and access information of the source, wherein the access information is configured to access the source or obtain other information than the first original information in the source.

In some embodiments, the source of the first information is a first instant messaging session, and the first original information is first instant messaging information sent within the first instant messaging session.

In some embodiments, the first information comprises information forwarded based on the first instant messaging information, or first detail information relevant to the first instant messaging information.

In some embodiments, the first association relation comprises that the account does not belong to a member of the first instant messaging session, and the second association relation comprises that the account belongs to a member of the first instant messaging session.

In some embodiments, the method further comprises: displaying an instant messaging session interface configured to display one or more instant messaging information; in response to a triggering operation on the instant messaging information displayed on the instant messaging session interface, determining task information based on the triggered instant messaging information and user input; determining a target session interface associated with the triggering operation; and displaying a task interface in a predetermined form in the target session interface, wherein the task interface is obtained based on the task information and a predetermined information structure.

In some embodiments, the determining task information based on the triggered instant messaging information and user input comprises: if the triggered instant messaging information comprises text information, determining content information of initial task information based on the text information; and/or if the triggered instant messaging information comprises an electronic file, determining attachment information of the initial task information based on the electronic file.

In some embodiments, the determining task information based on the triggered instant messaging information and user input comprises: performing semantic recognition on the triggered instant messaging information; obtaining current time information; and determining time information of the initial task information based on a semantic recognition result and the current time information.

In some embodiments, the disclosure provides an information display method, comprising: displaying an instant messaging session interface configured to display one or more instant messaging information; determining task information based on user input in response to a task creation triggering operation; determining a target session interface associated with the task creation triggering operation; and displaying a task interface in a predetermined form in the target session interface, wherein the task interface is obtained based on the task information and a predetermined information structure.

In some embodiments, the task creation triggering operation comprises a triggering operation on instant messaging information displayed in the session interface; and the determining task information based on user input in response to a task creation triggering operation comprises: in response to the triggering operation on the instant messaging information, determining initial task information based on the triggered instant messaging information.

In some embodiments, the determining the initial task information based on the triggered instant messaging information comprises: if the triggered instant messaging information comprises text information, determining content information of the initial task information based on the text information; and/or if the triggered instant messaging information comprises an electronic file, determining attachment information of the initial task information based on the electronic file.

In some embodiments, the determining initial task information based on the triggered instant messaging information comprises: obtaining user information for a sender of the triggered instant messaging information; and determining creator information of the initial task information based on the user information.

In some embodiments, the determining the initial task information based on the triggered instant messaging information comprises: performing semantic recognition on the triggered instant messaging information; and determining the initial task information based on a semantic recognition result.

In some embodiments, the determining the initial task information based on a semantic recognition result comprises: obtaining current time information; and determining time information of the initial task information based on the semantic recognition result and the current time information.

In some embodiments, the determining the target session interface associated with the task creation triggering operation comprises: displaying prompt information to prompt a user whether to take a currently displayed instant messaging session interface as the target session interface.

In some embodiments, the method further comprises: displaying task detail information associated with the task interface if the task interface displayed in the instant messaging session interface is triggered in a predetermined manner; wherein the task detail information is displayed in a sidebar of the instant messaging session interface.

In some embodiments, the task detail information is editable, and the method further comprises: determining information displayed by the task interface based on the edited task detail information.

In some embodiments, the disclosure provides an information display system, comprising a server and a client, the server being connected with the client, wherein the server is configured to perform any information processing method provided by the embodiments of the disclosure.

In some embodiments, the disclosure provides an information display system, comprising a server and a client, the server being connected with the client, wherein the client is configured to perform any information processing method provided by the embodiments of the disclosure.

In some embodiments, the disclosure provides an information processing apparatus, comprising: a relation determination unit, configured to determine an association relation between a user receiving first information and a source of the first information, wherein the first information is generated based on first original information within the source; and an information determination unit, configured to determine information of the source to be displayed to the user based on the association relation; wherein the information of the source comprises first source information if the association relation is a first association relation, and the information of the source comprises second source information if the association relation is a second association relation.

In some embodiments, the disclosure provides an information display apparatus, comprising: an information receiving unit, configured to receive first information and source information from a server, wherein the source information is determined based on an association relation between an account that currently logs in a client and a source of the first information, and the first information is generated based on first original information within the source; and an information display unit, configured to display the first information and the source information.

In some embodiments, the disclosure provides an information display apparatus, comprising: a session information display unit, configured to display an instant messaging session interface that is configured to display one or more instant messaging information; a task information determination unit, configured to determine task information based on user input in response to a task creation triggering operation; a target session determination unit, configured to determine a target session interface associated with the task creation triggering operation; and a task interface display unit, configured to display a task interface in a predetermined form in the target session interface, wherein the task interface is obtained based on the task information and a predetermined information structure.

In some embodiments, the disclosure provides an electronic device, comprising: at least one processor; and at least one memory storing instructions that upon execution by the at least one processor cause the electronic device to perform any information processing method provided by the embodiments of the disclosure.

In some embodiments, the disclosure provides a non-transitory computer storage medium, storing program instructions that upon execution by a computing device, cause the computing device to perform any information processing method provided by the embodiments of the disclosure. The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An information display method, comprising:
  displaying a session interface of an instant messaging application, wherein the session interface is one of a plurality of session interfaces corresponding to a plurality of groups, the session interface corresponds to one of the plurality of groups, and each of the plurality of session interfaces is configured to display one or more instant messaging information shared by members of a corresponding group among the plurality of groups;
  displaying a preset identifier on the session interface, wherein the comprises a preset identifier is configured to trigger a creation of a task based on a piece of messaging information displayed in the session interface of the instant messaging application;
  determining task information based on user input in response to a task creation triggering operation performed on the preset identifier;
  determining a target session interface from the plurality of session interfaces to which the task information is to be sent; and
  displaying a task interface in the target session interface corresponding to a target group among the plurality of groups, wherein the task interface is visible to members of the target group, and wherein the task interface is configured to display the task information in a predetermined information structure.

2. The information display method according to claim 1, wherein the task creation triggering operation comprises a triggering operation on instant messaging information displayed in the session interface, and
wherein the determining task information based on user input in response to a task creation triggering operation comprises: in response to the triggering operation on the instant messaging information, determining initial task information based on the triggered instant messaging information.

3. The information display method according to claim 2, wherein the determining the initial task information based on the triggered instant messaging information comprises:
if the triggered instant messaging information comprises text information, determining content information of the initial task information based on the text information; or
if the triggered instant messaging information comprises an electronic file, determining attachment information of the initial task information based on the electronic file; or
obtaining user information for a sender of the triggered instant messaging information, and determining creator information of the initial task information based on the user information, or
performing semantic recognition on the triggered instant messaging information, and determining the initial task information based on a semantic recognition result.

4. The information display method according to claim 3, wherein the determining the initial task information based on a semantic recognition result comprises:
obtaining current time information; and
determining time information of the initial task information based on the semantic recognition result and the current time information.

5. The information display method according to claim 2, wherein the determining the target session interface associated with the task creation triggering operation comprises:
displaying prompt information to prompt a user whether to take a currently displayed instant messaging session interface as the target session interface.

6. The information display method according to claim 1, further comprising:
displaying task detail information associated with the task interface if the task interface displayed in the instant messaging session interface is triggered in a predetermined manner;
wherein the task detail information is displayed in a sidebar of the instant messaging session interface.

7. The information display method according to claim 6, wherein the task detail information is editable, and
wherein the method further comprises: determining information displayed by the task interface based on the edited task detail information.

8. An information processing apparatus, comprising:
at least one processor; and
at least one memory communicatively coupled to the at least one processor and storing instructions that upon execution by the at least one processor cause the apparatus to perform operations comprising:
displaying a session interface of an instant messaging application, wherein the session interface is one of a plurality of session interfaces corresponding to a plurality of groups, the session interface corresponds to one of the plurality of groups, and each of the plurality of session interfaces is configured to display one or more instant messaging information shared by members of a corresponding group among the plurality of groups;
displaying a preset identifier on the session interface, wherein the preset identifier is configured to trigger a creation of a task based on a piece of messaging information displayed in the session interface of the instant messaging application;
determining task information based on user input in response to a task creation triggering operation performed on the preset identifier;
determining a target session interface from the plurality of session interfaces to which the task information is to be sent; and
displaying a task interface in the target session interface corresponding to a target group among the plurality of groups, wherein the task interface is visible to members of the target group, and wherein the task interface is configured to display the task information in a predetermined information structure.

9. The information display apparatus according to claim 8, wherein the task creation triggering operation comprises a triggering operation on instant messaging information displayed in the session interface, and
wherein the determining task information based on user input in response to a task creation triggering operation comprises: in response to the triggering operation on the instant messaging information, determining initial task information based on the triggered instant messaging information.

10. The information display apparatus according to claim 9, wherein the determining initial task information based on the triggered instant messaging information comprises:
if the triggered instant messaging information comprises text information, determining content information of the initial task information based on the text information; or
if the triggered instant messaging information comprises an electronic file, determining attachment information of the initial task information based on the electronic file; or
obtaining user information for a sender of the triggered instant messaging information, and determining creator information of the initial task information based on the user information, or
performing semantic recognition on the triggered instant messaging information, and determining the initial task information based on a semantic recognition result.

11. The information display apparatus according to claim 10, wherein the determining the initial task information based on a semantic recognition result comprises:
obtaining current time information; and
determining time information of the initial task information based on the semantic recognition result and the current time information.

12. The information display apparatus according to claim 9, wherein the determining a target session interface associated with the task creation triggering operation comprises:
displaying prompt information to prompt a user whether to take a currently displayed instant messaging session interface as the target session interface.

13. The information display apparatus according to claim 8, wherein the operations further comprise:

displaying task detail information associated with the task interface if the task interface displayed in the instant messaging session interface is triggered in a predetermined manner;
wherein the task detail information is displayed in a sidebar of the instant messaging session interface.

14. The information display apparatus according to claim 13, wherein the task detail information is editable, and
wherein the operations further comprise: determining information displayed by the task interface based on the edited task detail information.

* * * * *

UNITED STATES PATENT AND TRADEMARK OFFICE
CERTIFICATE OF CORRECTION

| | |
|---|---|
| PATENT NO. | : 12,355,711 B2 |
| APPLICATION NO. | : 18/389757 |
| DATED | : July 8, 2025 |
| INVENTOR(S) | : Yiyuan Lin et al. |

Page 1 of 1

It is certified that error appears in the above-identified patent and that said Letters Patent is hereby corrected as shown below:

In the Claims

Column 32; Line No. 54 (Claim 1): Remove "comprises a"

Signed and Sealed this
Nineteenth Day of August, 2025

Coke Morgan Stewart
*Acting Director of the United States Patent and Trademark Office*